(12) United States Patent
Kano et al.

(10) Patent No.: US 6,738,166 B1  
(45) Date of Patent: May 18, 2004

(54) DOCUMENT READING APPARATUS

(75) Inventors: Mitsunari Kano, Seto (JP); Yoshiharu Konishi, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/336,688

(22) Filed: Jun. 21, 1999

(30) Foreign Application Priority Data

Jun. 24, 1998 (JP) .............................. 10-176779

(51) Int. Cl.$^7$ .................................................. G06K 1/04
(52) U.S. Cl. ...................................................... 358/486
(58) Field of Search ................................ 358/488, 481, 358/296, 497, 494, 474, 486; 382/112, 312, 137, 122, 317, 318, 113, 100; 348/311, 195, 142; 355/41, 77, 63; 250/556

(56) References Cited

U.S. PATENT DOCUMENTS

| 4,302,782 A | * | 11/1981 | Gunning et al. ............ 358/296 |
| 4,400,071 A | * | 8/1983 | Tamura et al. .............. 354/25 |
| 5,319,419 A | * | 6/1994 | Ishida et al. ................ 399/208 |
| 5,335,093 A | * | 8/1994 | Imoto ......................... 358/487 |
| 5,430,550 A | * | 7/1995 | Hashimoto et al. ......... 358/488 |
| 5,978,102 A | * | 11/1999 | Matsuda ..................... 358/474 |
| 6,292,275 B1 | * | 9/2001 | Yamamoto et al. ......... 358/474 |

FOREIGN PATENT DOCUMENTS

| JP | 7-184041 | 7/1995 |
| JP | 8-287176 | 11/1996 |

* cited by examiner

Primary Examiner—Timothy M. Johnson  
Assistant Examiner—Seyed Azarian  
(74) Attorney, Agent, or Firm—Antonelli, Terry, Stout & Kraus, LLP (57) ABSTRACT

In reading an image of the document, the CCD sensor reads the image of the document through the image reading lens. The reading head including the image reading lens and the CCD sensor is arranged deviated from the center of the document reading area so that the reading head is removed from above the document. The image of the document read in is corrected by the image correction device, and the corrected image is displayed on the display.

10 Claims, 9 Drawing Sheets

DOCUMENT READING APPARATUS

BACKGROUND OF THE INVENTION

1. Field of the Invention

The present invention relates to a document reading apparatus for optically reading images on documents such as vouchers and forms, and more particularly to a document reading apparatus used in banking business that performs optical character recognition (OCR) on public money vouchers and payment/receipt slips and reads images on a variety of documents to input diagrammatic and line-drawn images.

2. Description of Related Art

Among document reading apparatuses designed to take in images on documents, including images of various kinds of vouchers and slips to be OCR-processed and images of seals, portraits and signatures on documents, there are mainly two types. One is a fixed sensor type in which an image sensor (line sensor) for optically reading a one-dimensional image is held immovable and a document is fed over the image sensor to read an image. Another is a flat bed scanner type in which a sensor is moved relative to a document placed on a bed to read an image.

In recent years a document reading apparatus has been proposed which employs a camera incorporating a two-dimensional image reading sensor (referred to as a two-dimensional sensor type). A scanner of the two-dimensional sensor type has a small number of two-dimensional sensor pixels and thus at present has difficulty in reading images at a resolution high enough to be able to optically recognize characters on a document. Therefore, the scanner is applied to reading only a narrow area of an image. To improve this type of the document reading apparatus, it may be possible to arrange a head section including a lens over the face of the document and move a one-dimensional image reading head or sensor in a sub-scan direction on a plane where the image of the document is focused through the lens (referred to as a main-/sub-scan type).

The document reading apparatuses of the two-dimensional sensor type and the main-/sub-scan type can read images even in those cases which cannot be dealt with by the document feeding type, i.e., in cases where a job involves the use of different kinds of documents having different sheet thicknesses or where a plurality of sheets are bound. These types of the document reading apparatuses can also prevent the face of a document to be scanned from being hidden from a user as it is in the flat bed scanner type.

Among literatures that describe technologies related to these document reading apparatuses is JP-A-5-153344.

The above-described types of the document reading apparatuses have a drawback of increased size because the document is fed or it is placed on a bed. The two-dimensional sensor type and the main-/sub-scan type, too, have a drawback in addition to an increased size. That is, the read head section, because it protrudes over the document face, can become an obstacle to an operator putting the document in place or pose a safety problem that the operator may hit against it.

SUMMARY OF THE INVENTION

An object of the present invention is to provide a document reading apparatus which allows easy setting of a document to be read and has good operability.

Another object of the present invention is to provide a document reading apparatus which directly drives an image reading sensor which can read a variety of kinds of documents.

In concrete terms, it is the object of the present invention to provide a document reading apparatus which is improved over the two-dimensional sensor type and main-/sub-scan type of document reading apparatuses suited for reading documents used in banks; which has improved operability and safety in putting a document in place; and which has an improved shape, compared with the conventional apparatus in which the head section protrudes over the face of the document impairing the appearance of the apparatus as well as the office.

To achieve these objectives, the present invention comprises: a reading sensor arranged deviated from the center of a document to be read and adapted to be moved when reading an image of the document; a drive circuit for driving the reading sensor; a correction device for correcting a result of reading performed by the reading sensor; and a display for displaying the image corrected by the correction device.

The document reading apparatus of the invention has an image reading section that includes an optical system, in which an extended line of an image plane of the document, an extended line of a lens perpendicular to the lens optical axis, and an extended line of a light receiving plane of the image sensor are intersected at one point.

DESCRIPTION OF THE EMBODIMENTS

Now, one embodiment of the present invention will be described in detail by referring to the accompanying drawings. First, let us explain about the working principle of the invention. In the conventional document reading apparatuses of two-dimensional sensor type and main-/sub-scan type, because the lens is installed over the face of a document (voucher and form) to be read, the reading head section in principle protrudes over the face of the document.

Figure 3:
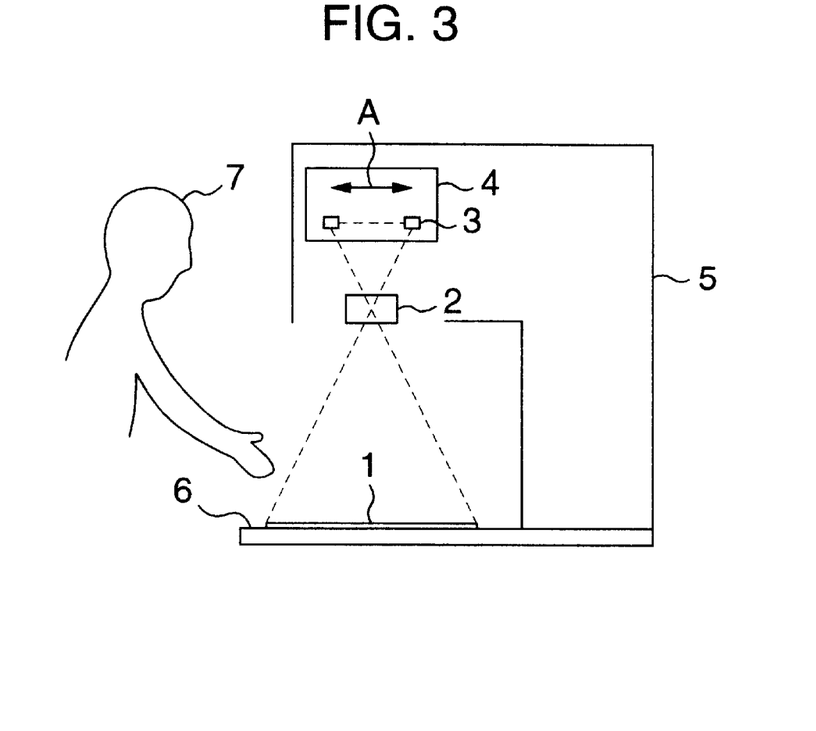
FIG. 3 is a schematic diagram showing a conventional document reading apparatus that reads a document from a position in front of the document.

An example of the conventional apparatus will be described by referring to the main-/sub-scan type of the apparatus shown in FIG. 3. In this type of apparatus, a lens 2 is arranged over the face of a document 1 to be read which is placed on a table 6. A one-dimensional image reading sensor 3 is moved in a sub-scan direction (direction of arrow A) on a plane where the image of the document 1 is focused. When the lens 2 focuses the image of the document 1 on the plane where the one-dimensional image reading sensor 3 travels, the image is read in a manner equivalent to that of the two-dimensional sensor type. This two-dimensional image reading sensor can use, for example, a one-dimensional image reading sensor. If a sensor of 5,000 pixels is moved in the sub-scan direction, this matches a two-dimensional image reading sensor with 5,000 pixels× 7,500 scans=37,500,000 pixels, which is suited for reading images at a very high resolution. Further, this type of apparatus allows an operator 7 to position the document 1 while directly watching the document 1 and thus offers an excellent operability.

With this document reading apparatus, however, because the reading head section protrudes in front of the face of the document 1 (in FIG. 3, over the document), it is difficult to position the document 1 and in some cases there is a danger of a head of the operator 7 contacting the reading head section.

To overcome these drawbacks, the inventors have invented a document reading apparatus which arranges the reading head section at a position that does not hinder the positioning of a document and which has an optical system that, even at this position, can optically scan an image on the document. In this document reading apparatus invented by the inventors, the reading head as the optical system is located at a position deviated from above the document, i.e., the optical center axis of the lens is shifted from the center of an area to be read, and a sensor is provided which moves relative to the lens, thereby allowing the reading head section to be located at a position that does not hinder the positioning of the document and to read the image on the document.

This optical system can take advantage of an optical characteristic described later, called "tilt" or "shift," which enables scanning of an image which is not similar to an image on the document, for example, an image deformed into a trapezoid, for example. The scanner of the invention may be constructed so that an image not similar to the original image on the document is reproduced into the one that is similar to the original image.

Now, embodiments of the document reading apparatus according to the present invention will be described step by step. The following embodiments take up a case where a CCD sensor is employed as the image reading sensor.

Figure 1:
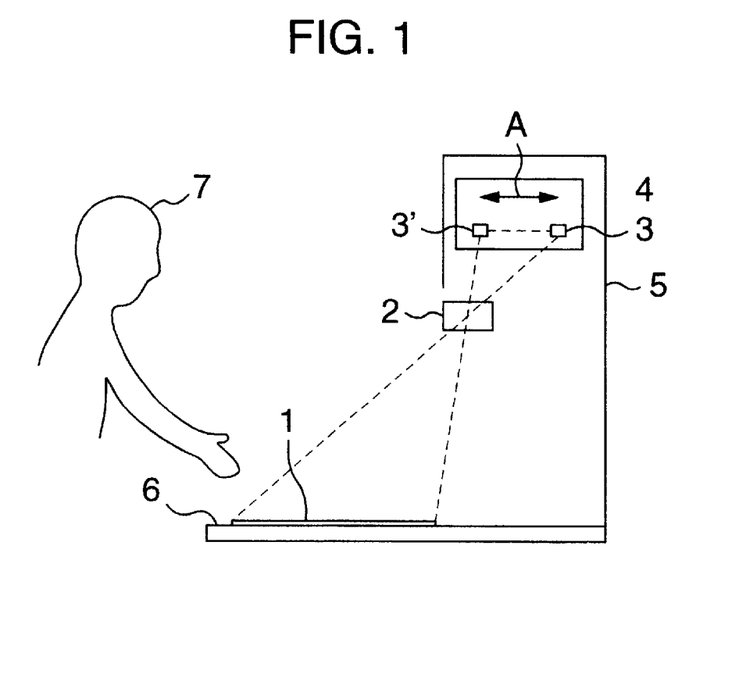
FIG. 1 is a schematic diagram showing the mechanism of a document reading apparatus according to a first embodiment of the present invention which reads a document from a position deviated from the front face of the document.

FIG. 1 shows a document reading apparatus according to a first embodiment of the invention. This scanner employs a reading head section 4 which has a lens 2 located on a side opposite the operator 7 with respect to the center of the document 1. In this reading head section 4 the CCD sensor 3 is mechanically moved from a position 3 to a position 3' in a direction of arrow A relative to the stationary lens 2 to scan and read the entire surface of the document 1. The lens 2 according to this embodiment is preferably of a design in which an area where an image can be effectively focused (called an image circle) is large enough to produce a focused image of peripheral portions.

Figure 2:
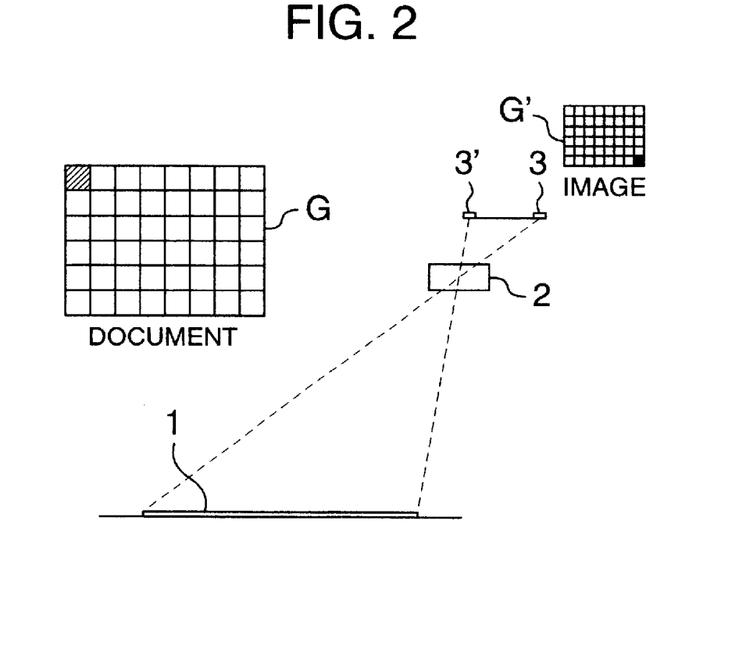
FIG. 2 is a schematic diagram showing an optical system of the document reading apparatus of FIG. 1.

To read an image G of the document 1 through the lens 2, the scanner of this embodiment, as shown in FIG. 2, focuses on the CCD sensor 3 an image G' which is similar to the one-dimensional image sensor movement plane (from a position 3 to a position 3') and inverted horizontally and vertically. This image can be converted into a desired original image G of the document 1 by appropriately arranging the sensor and setting the scan direction.

In the document reading apparatus of this embodiment, because the reading head section 4 does not protrude over the front face of the document 1, it does not pose any physical hindrance to positioning the document 1 or to the viewing field on the document for the operator 7.

Figure 4:
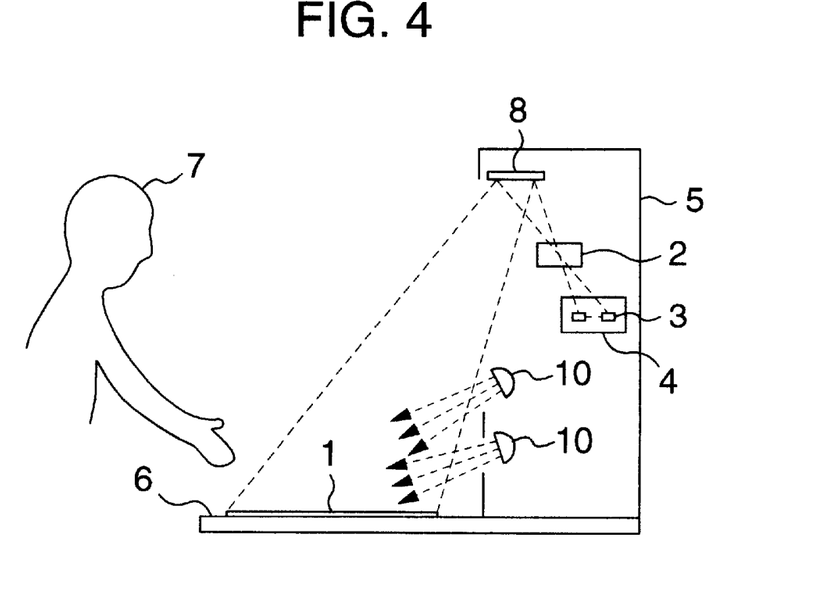
FIG. 4 is a schematic diagram showing the mechanism of a document reading apparatus according to a second embodiment of the present invention in which the height of the apparatus is lowered.

FIG. 4 shows a document reading apparatus according to a second embodiment which further develops the concept of the scanner of the previous embodiment. The scanner of this embodiment has a reflection mirror 8 installed at the top of a scanner case 5, a lens 2 and a reading head section 4 arranged below the reflection mirror 8, and a lamp 10 for illuminating the document 1.

In this document reading apparatus, the image of the document 1 is reflected by the reflection mirror 8 and, as in the preceding embodiment, the moving CCD sensor 3 scans and reads the entire surface of the document 1 through the lens 2.

Because of the reflection mirror 8, the document reading apparatus of this embodiment can reduce the height and therefore the size of the scanner. Further, because the illuminating lamp 10 can be incorporated in the scanner case 5, it is possible to enhance the reading precision and to construct the apparatus in an all-in-one structure.

Although the document reading apparatuses of these embodiments have been explained under the assumption that the one-dimensional image sensor is moved, it is possible to use a stationary two-dimensional image sensor if the number of pixels in the two-dimensional image sensor increases to a level high enough to meet a high resolution required by, for example, OCR. While, in the examples of FIGS. 1 and 4, the sub-scan movement direction of the one-dimensional image sensor is taken to be in the direction of arrow in the figure, the sub-scan direction can be set in a direction normal to the plane of the sheet of the drawing and the similar reading can still be obtained. In this case, the reference numbers 3–3' is oriented in the main scan direction of the CCD sensor 3.

Next, a scanner according to a third embodiment of the invention will be described by referring to FIG. 5. The scanner of the preceding embodiments can be designed under the assumption that the lens has a large image circle. The scanner shown in FIG. 5 can use a lens with an ordinary size of image circle while at the same time using a system in which the one-dimensional image sensor is moved.

Figure 5:
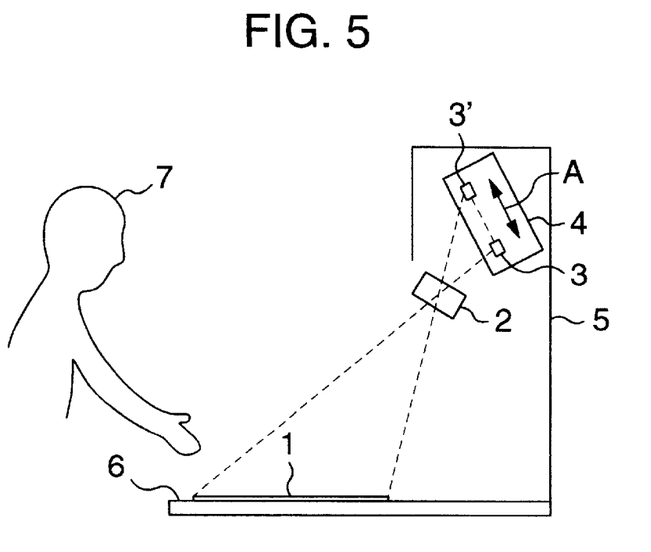
FIG. 5 is a schematic diagram showing the mechanism of the document reading apparatus according to the second embodiment that uses another optical system.
Figure 6:
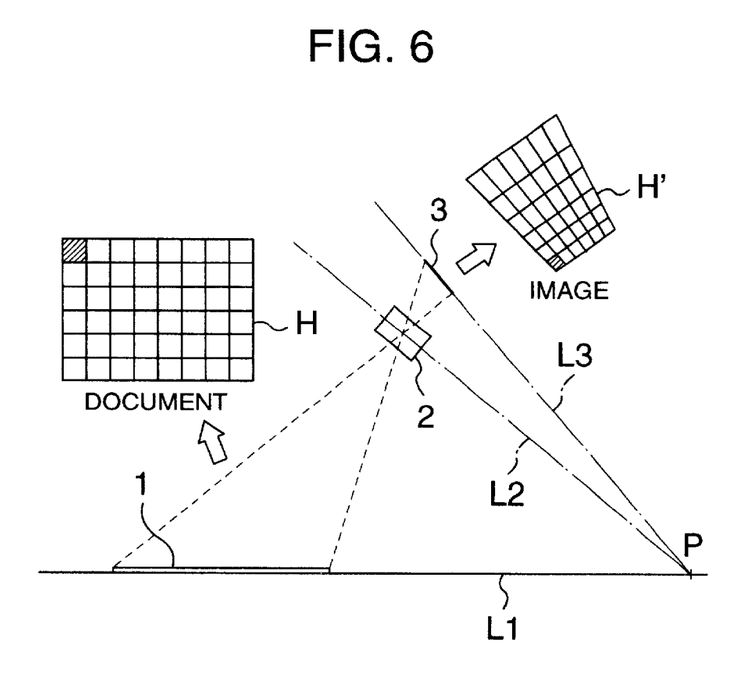
FIG. 6 is an explanatory view showing the optical system of the document reading apparatus shown in FIG. 5.

The principle of the scanner of FIG. 5 uses an image reading section that has an optical system shown in FIG. 6, i.e., a so-called tilt type optical system in which an extended line L1 of an image plane of the document 1, an extended line L2 of the lens 2 perpendicular to the lens optical axis, and an extended line L3 of a light receiving plane of the CCD sensor 3 that senses an image intersect at one point P. The tilt type optical system has a characteristic that the original image H of the document 1 is received as a trapezoidal image H' by the CCD sensor 3 as shown. Hence, the scanner of this embodiment should preferably perform scanning according to a predetermined function by limiting the sub-scan direction of the one-dimensional image sensor 3 to the direction of arrow A shown in FIG. 5 and controlling the movement of the sensor in the sub-scan direction so that the main scan positions on the document 1 are at equal intervals.

In the tilt type optical system, as shown in FIG. 6, the extended lines L1–L3 of the document 1 plane, the lens 2 plane and the CCD sensor 3 plane are made to intersect at a point P to form on the image sensor plane a focused image H' which is not similar to the original image H of the document but is trapezoidal. Therefore, corrections are made to obtain an image similar to that of the document 1 by controlling the movement of the sensor in the sub-scan direction and performing a line density conversion (enlargement and reduction) of the image in the main scan direction. The control of the sensor movement in the sub-scan direction can be determined analytically as described later. The movement control may be performed while calculating it. Where the processing speed is critical, it may be possible to tabulate calculated results in advance and perform the movement control by referencing the table.

Figure 7:
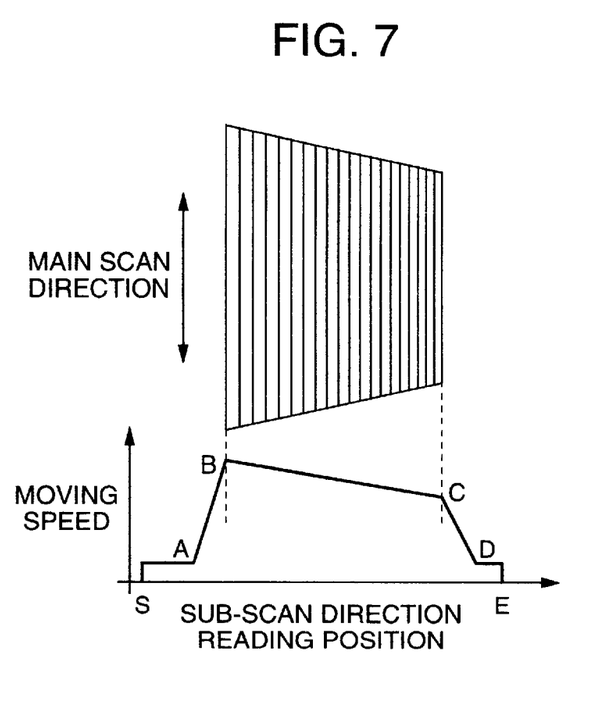
FIG. 7 is an explanatory view showing how an image is deformed trapezoidally in a sub-scan direction when read in by the document reading apparatus of the invention.
Figure 8:
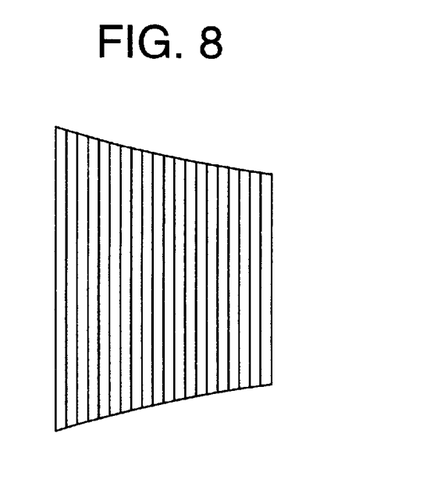
FIG. 8 is an image obtained after subjecting the image of FIG. 7 to the sub-scan direction correction.

The method of correcting the sub-scan direction deformation of a trapezoidal image by controlling the sensor movement in the sub-scan direction will be explained. FIG. 7 shows how an image is deformed trapezoidally in the sub-scan direction by the tilt. When a document with equally spaced lines is read in, the line interval in the sub-scan direction changes progressively as shown in FIG. 7. In other words, the image line density in the sub-scan direction changes. When the sensor movement is controlled according to a moving speed vs. reading position relationship shown at the bottom of the figure, the actually read image data will have curved outlines in the sub-scan direction, straight outlines in the main scan direction, and equal line intervals, as shown in FIG. 8. That is, the line density of the image read in becomes constant. This is obtained by increasing the moving speed where the line density of the read image is coarse and lowering the moving speed where the line density of the image is fine. This control is based on the calculated result of deformation caused by the tilt described later and ensures that the line density of a document image read in will be constant. The image obtained is trapezoidal because of the tilt (FIG. 7), and the line density of the image is dense on the top side (shorter side) of the trapezoid and coarse on the bottom side (longer side). Thus, when reading the bottom side of the image by the CCD sensor, the sensor movement is increased and, when reading the top side, decreased.

When controlling the moving speed of the CCD sensor, the moving speed must be determined based on a relation that corrects the deformation due to the tilt described earlier. In performing this correction with a practical precision, a common design method is to use a timer circuit for setting the time it takes to move from the current position to the next position. The timer circuit uses a digital circuit and therefore has a resolution determined by the clock frequency, i.e., a digitization error that depends on one clock time. For precise image reading, it is desired that the resolution or digitization error be set sufficiently small (for example, $1/1000$ or lower for the digitization error).

In that case, it is preferred that the number of divided movements be set equal to or greater than the reading density of the document image (i.e., the resolution of the image). In other words, when the image is to be read in at 8 pixels/mm, the control data on sensor movement is set to 8 divisions/mm or higher, thus producing a high-quality image with little deformation due to digitization errors during image reading. When the short side of an A4 size document (210 mm) is read in at 8 pixels/mm, the sensor movement over the short side is divided into 1,680 movements or more.

Figure 9:
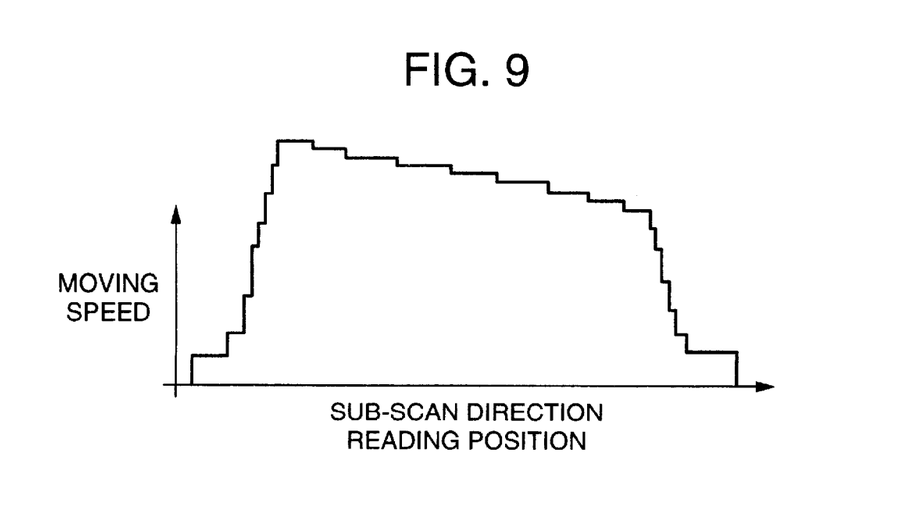
FIG. 9 is a diagram showing one example of controlling a moving speed and a reading position of a CCD sensor 3 in the sub-scan direction.

Conversely, there may be a case where the fine division cannot be used for economic reasons. In that case, some degradation in the image quality may be tolerated for the purpose of reducing the number of divisions and therefore the amount of control data on the sensor movement. This is shown in FIG. 9.

The image reading sensor generally performs reading at constant time intervals, and thus where the moving speed is large, the distance traveled increases. The reason that the moving speed progressively increases in a segment A-B is to ensure that the acceleration limit of a drive motor that drives the CCD sensor is not exceeded (i.e., to prevent an out-of-step). In a segment C-D, too, the speed is gradually lowered to prevent an out-of-step during a deceleration process. Segments S-A and D-E represent preparatory runs after motor starting and before stopping.

Figure 10:
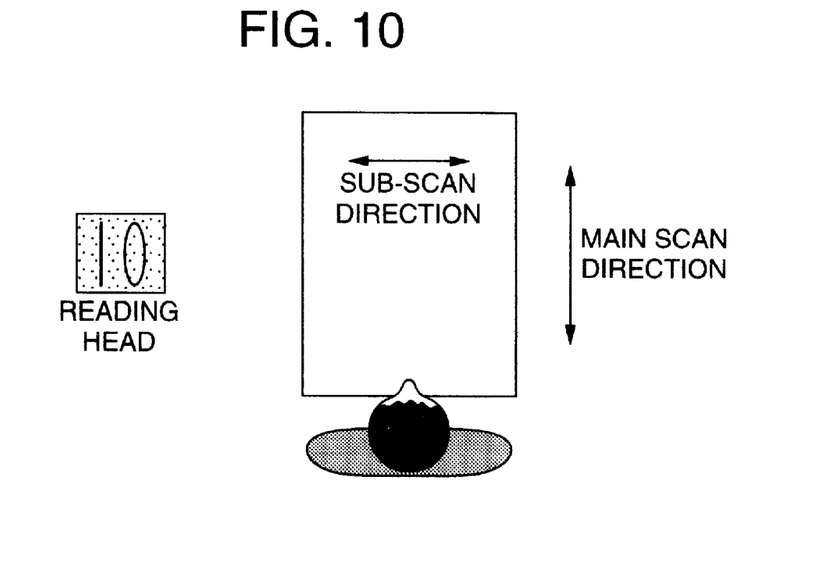
FIG. 10 is a diagram showing a positional relation between a document, a reading head and an operator in the document reading apparatus of the invention.

Next, the direction of reading performed by the document reading apparatus using the tilt type optical system will be described. When, as shown in FIG. 10, an A4 size document is read with its longitudinal direction set in a front and rear direction as seen from an operator and a lateral direction of the document set as the sub-scan direction, the sub-scan is performed a plurality of times in the lateral direction and therefore the number of reading operations performed is smaller than when the same document is read with the longitudinal direction set as the sub-scan direction. Further, under the illumination of the same luminous energy, if the same reading time is assumed to be used, the amount of exposure to the CCD sensor can be increased to the extent that the number of reading operations is reduced. This in turn leads to an improved S/N ratio of the image, allowing the reading of a high quality image.

When a tilt type optical system is constructed by shifting the reading head either to the left or right, the image processing time required by the sub-scan direction movement control can be shortened. Setting the lateral direction of the document as the sub-scan direction and also as the direction in which the optical system in the tilt arrangement looks down at the document, as described above, makes it possible to design a document reading apparatus which can perform reading with higher image quality under the same luminous energy and at higher speed.

When the sub-scan direction is taken to be the lateral direction of a document but if the direction in which the optical system in the tilt arrangement looks down at the document is the longitudinal direction of the document, the image processing time required by the sub-scan direction movement control cannot be shortened, thus prolonging the total processing time. When the sub-scan direction is taken to be the longitudinal direction of the document, the number of scan operations increases, thus reducing the amount of exposure to the CCD sensor, which in turn degrades the S/N ratio of the image.

Therefore, the best reading direction in which the document reading apparatus can read an image at high speed and with high quality can be obtained by setting the lateral direction of a document as the sub-scan direction and also as the direction in which the reading head looks down at the document.

Figure 11:
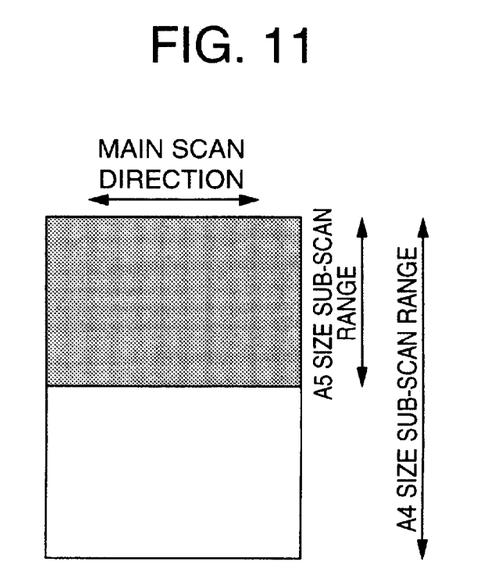
FIG. 11 is a diagram showing a relation between a sub-scan direction and document sizes.

In a special case where a document reading apparatus with an A4 size reading area is designed and it is desired to read only half the document, i.e., A5 size, at high speed, a high speed reading with the reading area limited to the A5 size can be realized by setting the lateral direction of the document as the main scan direction and the longitudinal direction of the document as the sub-scan direction. This setting stops the reading operation when the lateral length of A5 size, i.e., one-half the longitudinal length of A4 size, has been read, thereby limiting the reading area to the A5 size and achieving high-speed reading. In this case also (FIG. 11), if the tilt is used, it is advantageous in terms of processing capability to look at the document in the sub-scan direction.

Figure 12:
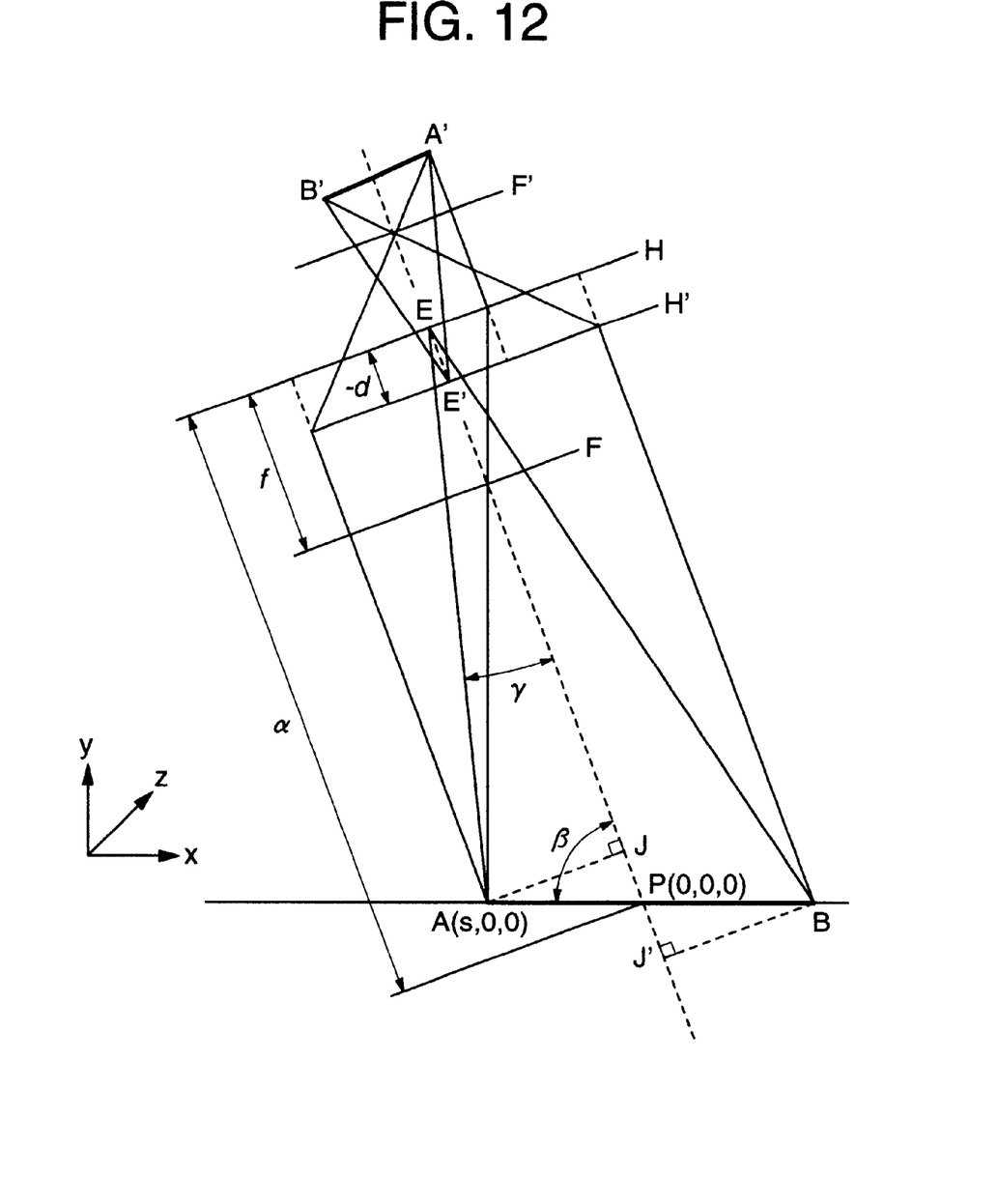
FIG. 12 is a diagram showing the principle of a tilt type optical system in the document reading apparatus of the invention.

Next, the tilt type optical system will be described in detail. The optical system is arranged as shown in FIG. 12, with the image plane of the document represented by a line segment A-B, the image plane on the sensor side represented by a line segment A'-B', and these line segments set at a tilt angle of $\beta$. If we let f stand for a focal distance of a lens, d for a distance between front and rear principal points, and $\alpha$ for a front optical path length of the lens on the optical axis, then the coordinates of point E, the length of the line segment AB, and the angle $\gamma$ between the line segments AB and A'B' are determined from the following equations.

Coordinates of point E: $E(x, y) = E(-\alpha \cos \beta, \alpha \sin \beta)$ $$\text{Line } AE: y = -\frac{\alpha \cdot \sin\beta}{(\alpha \cdot \cos\beta + s)} \cdot (x - s)$$

Coordinates of point E': $E'(x, y) = E'(-(\alpha+d) \cdot \cos \beta, (\alpha+d) \cdot \sin \beta)$ Because Line AE//A'E', $$\text{Line } A'E': y = -\frac{\alpha \cdot \sin\beta}{(\alpha \cdot \cos\beta + s)}\{x + (\alpha + d) \cdot \cos\beta\} + (\alpha + d) \cdot \sin\beta$$

$$\equiv G_1 \cdot (x - G_2) + G_3$$

Line segment $\overline{AE}$: $\overline{AE_x} = s + \alpha \cdot \cos \beta$   $\overline{AE_y} = \alpha \cdot \sin \beta$ therefore, $\overline{AE} : \sqrt{\overline{AE_x}^2 + \overline{AE_y}^2} \equiv G_4$ when $0 \leq s$, $G_5 \equiv \overline{AE} \cdot \sin \gamma = \overline{AJ} = \overline{AP} \cdot \sin \beta = -s \cdot \sin \beta$ when $0 < s$, $G_5 \equiv \overline{BJ'} = s \cdot \sin \beta$ The optical path length E-J in front of the lens as well as the positive or negative sign of s and others can be determined from the following equations.

$\overline{EJ} = \alpha + s \cdot \cos \beta \equiv G_6$

The line segment is assumed to be $\overline{A'E'} \cos \gamma \equiv G_7$ (optical path length behind the lens).

From $\frac{1}{\overline{EJ}} + \frac{1}{G_7} = \frac{1}{f}$, we get $G_7 = \frac{1}{\frac{1}{f} - \frac{1}{\overline{EJ}}} = \frac{1}{\frac{1}{f} - \frac{1}{G_6}} = \frac{G_6 \cdot f}{G_6 - f}$ $$\overline{A'E'} = \frac{G_7}{\cos\gamma} = \frac{G_7}{\frac{G_6}{G_4}} = \frac{G_4 \cdot G_7}{G_6} \equiv G_8$$

The coordinates of point A' of the sensor when $0 \geq s$ can be determined from the following equation.

$A'(x,y) = A'(-(\alpha+d) \cdot \cos \beta - G_8 \cdot \cos(\gamma+\beta), (\alpha+d) \cdot \sin \beta + G_8 \sin(\gamma+\beta)) = A'(G_2 - G_8 \cos(\gamma+\beta), G_3 + G_8 \cdot \sin(\gamma+\beta)) \equiv A'(G_9, G_{10})$ When $0 < s$, $A'(x,y) = A'(G_2 - G_8 \cdot \cos(\beta-\gamma), G_3 + G_8 \cdot \sin(\beta-\gamma)) \equiv A'(G_9, G_{10})$ The distance L traveled by point A' of the line segment A'-B' on the sensor side as the point A(s, 0) of the line segment A-B on the document side moves can be expressed as follows, with the coordinates of point A' on the image plane corresponding to the left end of the document taken to be A' ($G_{90}$, $G_{100}$):

$$L = \sqrt{(G_9 - G_{90})^2 + (G_{10} - G_{100})^2}$$

The length of the document as seen in a +Z direction (the direction in which the document is seen from the near side toward the far side) can be expressed as follows, with the point P, which is an intersection between an extended line of the lens optical axis and the line segment A-B, taken as a reference.

$$(Mt + Mb) \cdot \frac{\overline{A'E'}}{\overline{AE}} = (Mt + Mb) \cdot \frac{G_8}{G_4}$$

That is, if we let the Z-direction reference point for the document be P, the length of the image as seen from the corresponding image point is given as follows. It is seen that the image length or dimension changes according to this relation. In other words, the image on the sensor side changes according to the relation shown below and the document is transformed into a trapezoidal image like the image H' shown in FIG. 6 for example. Because the conditions such as lens characteristics and the distance to the document are defined, the relation defining FIG. 6 can be determined in advance. Hence, it is possible to obtain an image similar to the original image by using this relation and performing reverse transformation on the received image on the sensor.

Figure 13:
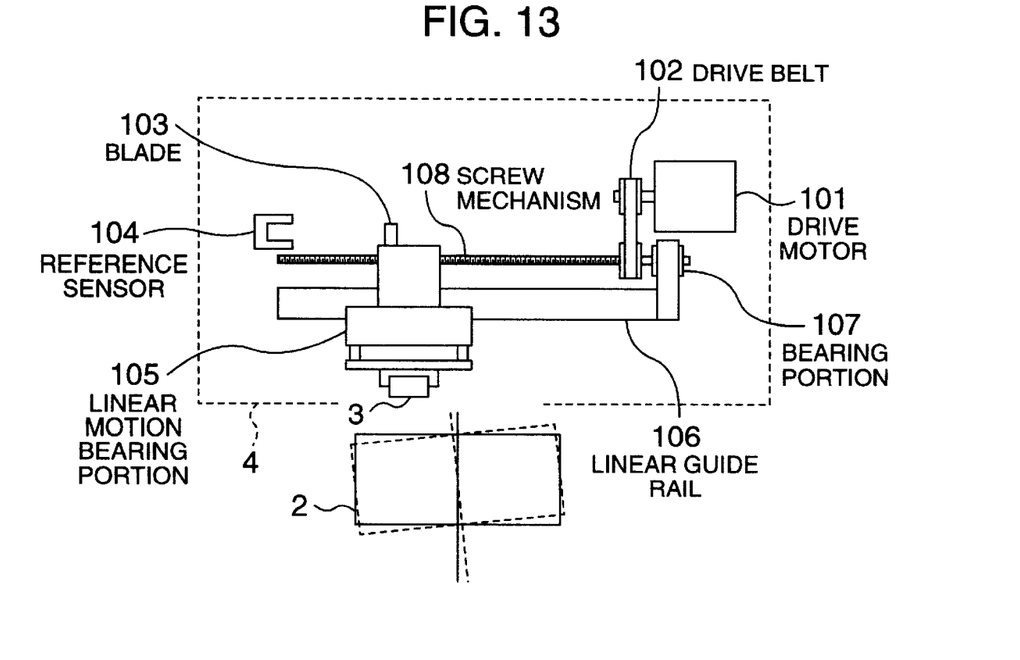
FIG. 13 is a schematic diagram showing a one-dimensional image reading sensor moving mechanism according to the invention.

$Mt \cdot \frac{G_8}{G_4}$ in $-Z$ direction $Mb \cdot \frac{G_8}{G_4}$ in $+Z$ direction FIG. 13 shows the detail of the above-described reading head section 4 and lens 2. The reading head section 4, as shown in FIG. 13, includes: a linear motion bearing portion 105 for supporting the sensor 3; a linear guide rail 106 for guiding the movement of the linear motion bearing portion 105; a drive motor 101 for generating a rotary driving force; a drive belt 102 for transmitting the driving force to a bearing portion 107; a screw mechanism 108 which rotates in synchronism with the rotation of the bearing portion 107 and engages; with the linear motion bearing portion 105 to linearly move the bearing portion 105; and a reference sensor 104 for detecting the reference position of the sensor 3 by contacting a blade 103 provided on the bearing portion 105.

The reading head section 4 with the above construction moves the linear motion bearing portion 105 by the rotation of the drive motor 101 to a reference position where it is detected by the reference sensor 104. When the scanning is started, the drive motor 101 is rotated by a predetermined speed control to cause the sensor 3 to smoothly move parallelly by the linear guide rail 106 and the screw mechanism 108 without play, thus reading the entire surface of the document. In the examples of FIGS. 1, 2 and 4, the image plane formed as the sensor 3 moves is perpendicular to the lens;optical axis. In the example of FIGS. 5 and 6 with the tilt arrangement, however, the optical axis of the lens 2 indicated a dashed line is not perpendicular to the image plane formed by the sensor movement.

Figure 14:
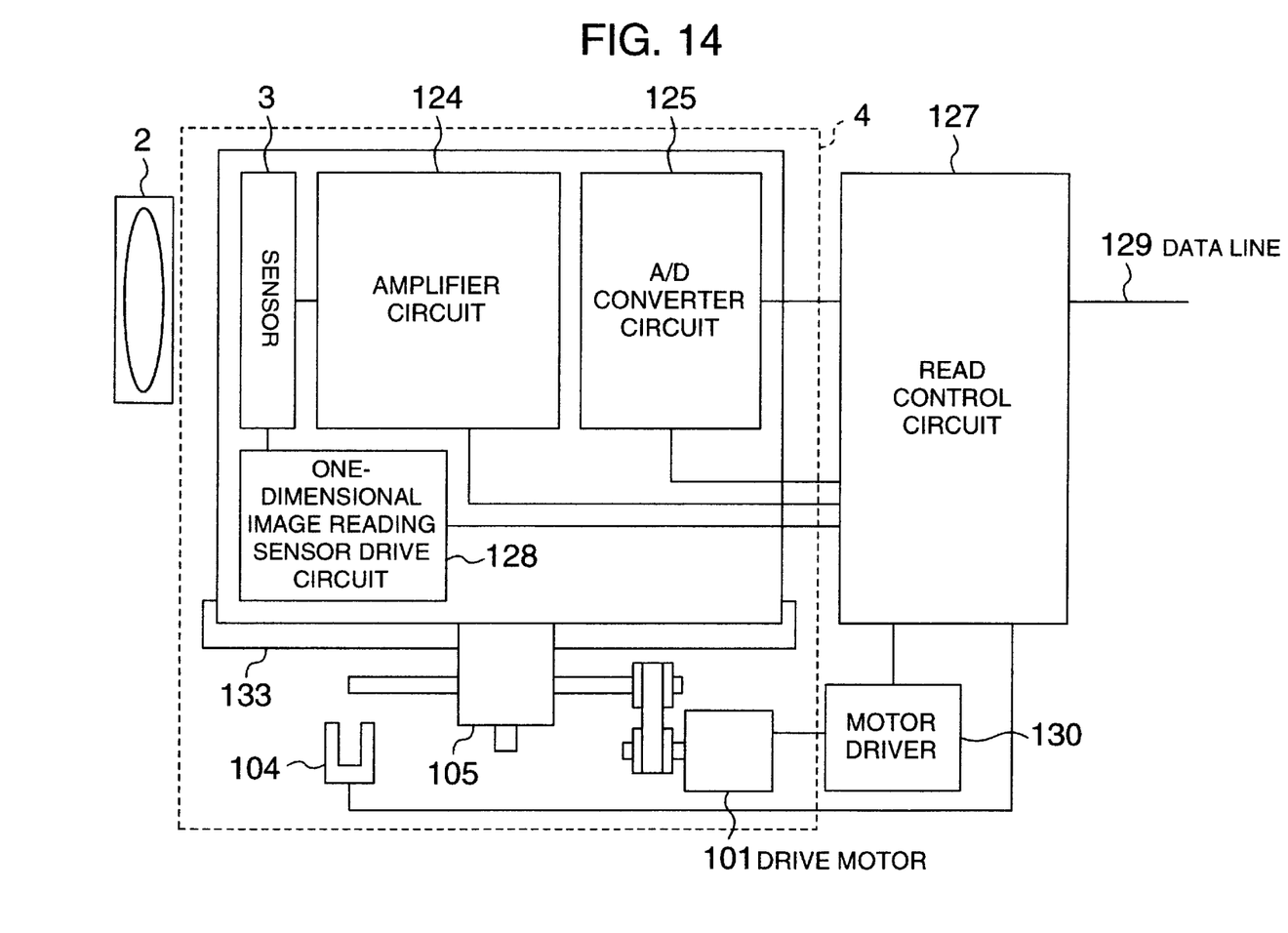
FIG. 14 is a block diagram showing the configuration of the document reading apparatus of the invention.

Next, a control circuit of the document reading apparatus according to this embodiment will be described by referring to FIG. 14. The control circuit includes: a one-dimensional image reading sensor drive circuit 128 for driving the sensor 3 to scan an image received through the lens 2; an amplifier circuit 124 for amplifying an image output signal from the sensor 3; an A/D converter circuit 125 for A/D-converting the image output signal; a motor driver 130 for controlling the drive motor 101 that moves the sensor 3; and a read control circuit 127 for controlling these circuits to output the image output signal from the sensor 3 to a data line 129.

The read control circuit 127 may output the image (deformed image) from the sensor 3 as is and produce an image similar to the original document image by an image correction device (described later) connected to the read control circuit 127. The read control circuit 127 may also be arranged so as to process the image by a function provided by the OCR software of a connected personal computer to produce an image similar to the original document image. It is also possible to provide, the read control circuit 127 itself with an image processing function that converts the received image into an image similar to the original document image before outputting it. When the image processing function is provided to the read control circuit 127 or to the image correction device, there are advantages that the processing burden can be alleviated by the personal computer and that the apparatus can be used as a general document reading apparatus, not restricted by the personal computer to be connected or by the software used.

Figure 15:
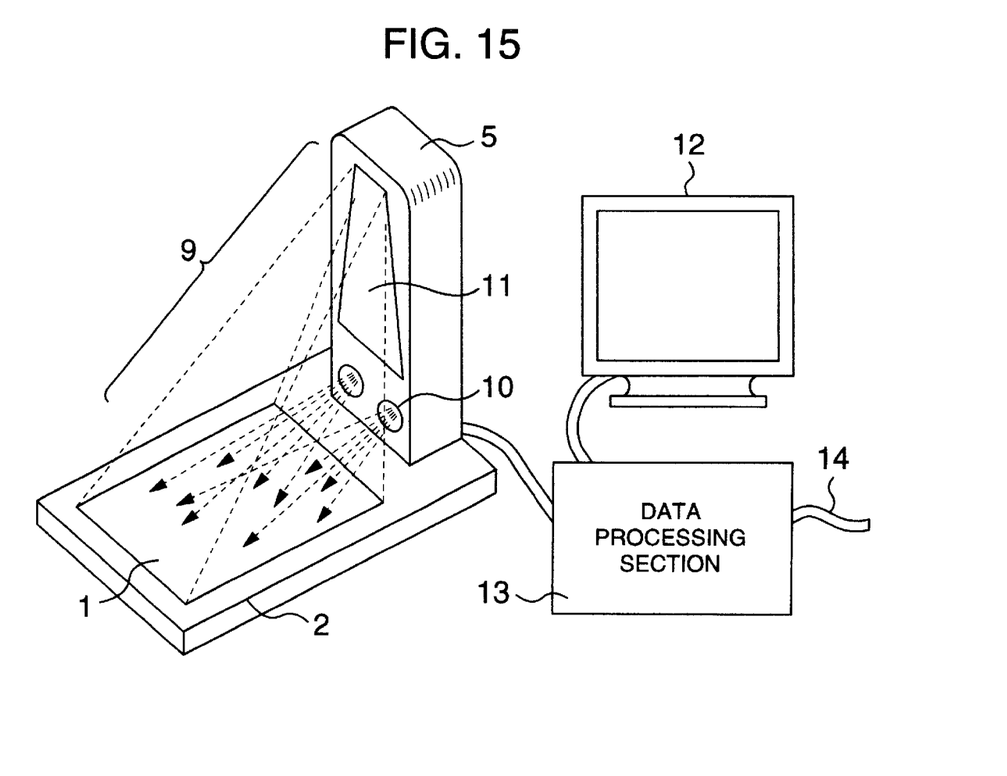
FIG. 15 illustrates an example system configuration using the document reading apparatus of the invention.

A system suited for document reading which has realized a reduced size, improved operability and enhanced safety by employing the above-described optical systems is shown in FIG. 15. The image data of a scanner section 9 that has read the document 1 placed on the table 2 through a read window 11 is transferred to a data processing section 13. The data processing section 13 performs image processing, such as correction of brightness variations of the image (shading correction), emphasis of outline and digitization, and transfers the processed image data to recognition processing. The recognition processing performs document reading processing such as character recognition based on the image data obtained. These processing are started when an operator who puts a document such as voucher and form in place presses a start button. Now, the scanner section reads an image. For an operator to check whether or not the document placed on the scanner table is a pertinent one for the work currently performed, whether necessary items are filled in, or whether the orientation of document is correct, the scanner section displays the image read in. When the operator decides that the image is what he or she wants, the successive image processing and recognition processing are performed. The results of these processing are transferred from the data line 14 in FIG. 15 to an external device for document reading processing.

Figure 16:
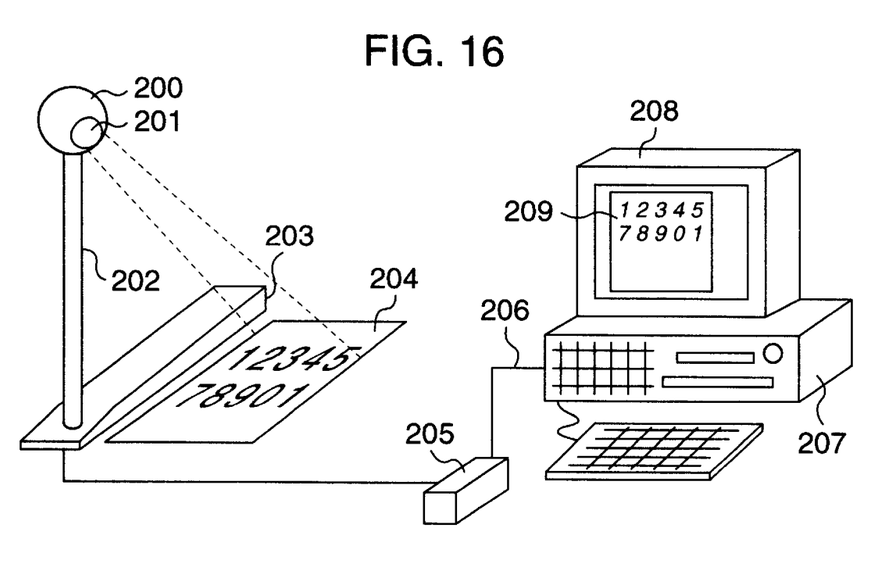
FIG. 16 illustrates another example system configuration using the document reading apparatus of the invention.

Next, the actual mode of use of the document reading apparatus of the invention will be explained by referring to FIG. 16. The document reading apparatus shown in the figure has a reading head section 200, spherical in external view, which incorporates a stationary lens, a moving sensor, a document illuminating lamp, etc.; a support leg 202 that supports the reading head section 200; and a stand section 203 that stably supports the support leg 202 and incorporates a power supply, a control circuit, etc. The reading head section 200 optically reads an image (numerals 1234578901, for instance) on an A4 size document 204 placed along the stand section 203 through a read window 201. The image output signal from the sensor is output to the data line and to the image correction device 205 through the control circuit incorporated in the stand section 203 which includes, as shown in FIG. 14, the above-described one-dimensional image reading sensor drive circuit, amplifier circuit, A/D converter circuit, reading drive circuit and read control circuit. The image correction device 205 performs the image processing on the input image data, such as correction of image brightness variations (shading correction), emphasis of outline and digitization, and converts the input image into an image similar to the original document image. The image correction device 205 outputs the processed image through a line 206 to a personal computer 207. The personal computer 207 recognizes characters contained in the image by the function provided by the OCR software installed in the computer and displays an image 209 on a display 208. Data transfer from the stand section 203 to the image correction device 205 is via an RS-422 cable, for example. Data transfer from the image correction device 205 to the personal computer 207 is via a SCSI cable and a SCSI board incorporated in the computer 207.

Figure 17:
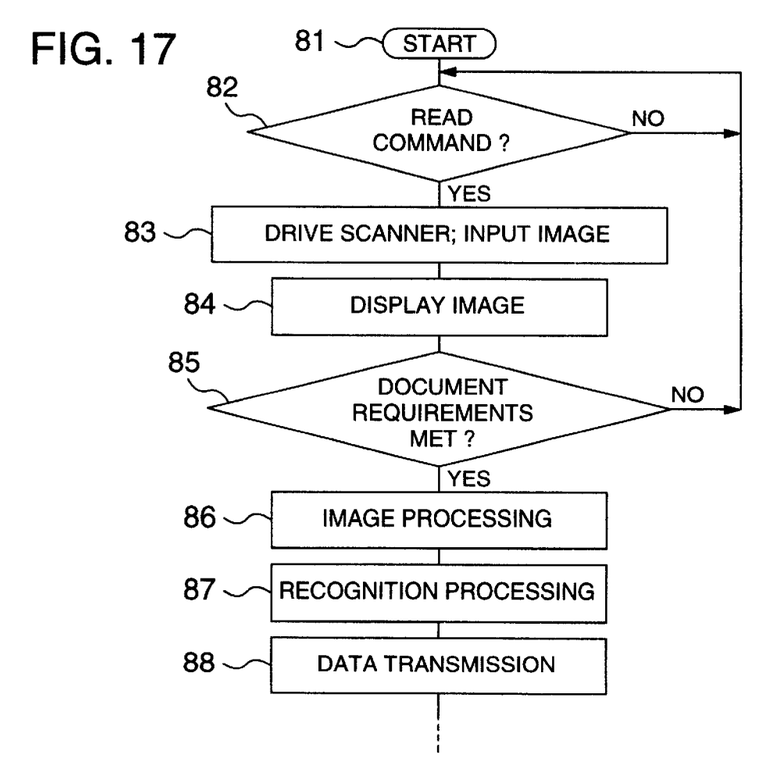
FIG. 17 is a flow chart showing the: document reading processing performed by the document reading apparatus of the invention.

Next, the recognition processing will be explained. This processing performs a reading operation such as character recognition based on the image data obtained, and one example of such processing is shown in a flow chart of FIG. 17. An operator, after putting a document such as voucher and form in place, presses a start button to start the image reading operation of the document reading apparatus (step 81). The reading head section 200 of the scanner reads an image (step 83) and the input image is displayed (step 84) to allow a visual check on whether the document 204 is set in the correct orientation, whether the document is pertinent for the work in progress or whether necessary items are filled in. When the operator decides that these conditions are met, the successive image processing (step 86; when the recognition processing is performed internally, step 87) is executed to transfer the processed image data through a data line to an external device.

When, to meet the requirement of character recognition, the reading precision is set at 240–400 dpi, the digital value reading speed is set at 0.6 sec/page (monochrome) to 1.0 sec/page (color with illumination) and the cable of SCSI-3 level is used, then the document reading apparatus of this embodiment can complete the character recognition processing at high speed in about 1.5 seconds from start to finish. The dimensions of the reading head section 200 are preferably about 100–150 m in diameter so that it will not pose any interference with the operator, and preferably about 550 mm in height considering the reading range of the scanner (A4 size document).

The document reading apparatus of the present invention can make improvements on the two-dimensional sensor type and the main-/sub-scan type of document reading apparatus suited for reading documents such as vouchers and forms in banking business, can improve operability and safety when an operator places the document on the apparatus, and can further improve the external shape of the apparatus so that the reading head section will not protrude in front of (or over) the face of the document as it does in the conventional apparatus which mars the appearance of an office. This document reading apparatus allows the operator to check the document while it is scanned, assures operability and safety of the scanner, and reduces the size of the apparatus. Because the reading section is installed in a rear case section which is located opposite the operator with respect to the document, the presence of the document reading apparatus in the office becomes inconspicuous, which in turn increases the freedom of layout in such places as bank offices where the apparatus is seen by customers. The document reading apparatus of the invention is not limited to the OCR processing of public money vouchers and other forms used in banking business but can also be applied to the input of images for making OHP slides and to the input of photographs and art works.

What is claimed is:

1. A document reading apparatus comprising:
   a reading sensor located at a position deviated from the center of a document and adapted to read an image of the document;
   a drive circuit for driving the reading sensor;
   a motor for moving the reading sensor;
   a motor driver for driving the motor; and
   a control circuit for controlling a moving speed of the reading sensor so that the moving speed is variable during reading of the image of the document;
   wherein the control circuit performs a control to increase the moving speed of the reading sensor when the apparatus reads a portion of the document whose line density is coarser than a portion of the document whose line density is dense.

2. A document reading apparatus comprising:
   a reading sensor located at a position deviated from the center of a document and adapted to read an image of the document;
   a drive circuit for driving the reading sensor;
   a motor for moving the reading sensor;
   a motor driver for driving the motor; and
   a control circuit for controlling a moving speed of the reading sensor so that the moving speed is variable during reading of the image of the document;
   wherein the control circuit performs a control so that a sub-scan speed at a bottom side of a trapezoidal image of the document read by the reading sensor is greater than a sub-scan speed at a top side of the trapezoidal image.

3. A document reading apparatus comprising:
   a reading table on which a document is set;
   a reading sensor which moves relative to the document which is set on the table to read the image of the document; and
   a control circuit which controls movement of the reading sensor and varies a moving speed of the reading sensor during reading of the image of the document while moving of the reading sensor;
   wherein said control circuit performs a control to increase the moving speed of the reading sensor when reading a portion of the document in which a line density is lower than a portion of the document in which a line density is high.

4. A document reading apparatus comprising:
   a reading table on which a document is set;
   a reading sensor which moves relative to the document which is set on the table to read the image of the document; and
   a control circuit which controls movement of the reading sensor and varies a moving speed of the reading sensor during reading of the image of the document while moving of the reading sensor;
   wherein said control circuit controls the moving speed of the reading sensor such that a sub-scan speed at a bottom side of a trapezoidal image of the document read by the reading sensor is greater than a sub-scan speed at a top side of the trapezoidal image of the document.

5. A document reading apparatus comprising:
   a reading table on which a document is set;
   a reading sensor which moves relative to the document which is set on the table to read the image of the document; and
   a control circuit which controls movement of the reading sensor and varies a moving speed of the reading sensor during reading of the image of the document while moving of the reading sensor;
   wherein said control circuit changes the moving speed of the reading sensor in multiple steps such that a number of the multiple steps is at least equal to a reading density of the document image.

6. A document reading apparatus comprising:
   a reading table on which a document is set;
   a reading sensor which moves relative to the document which is set on the table to read the image of the document; and
   a control circuit which controls movement of the reading sensor and varies a moving speed of the reading sensor during reading of the image of the document while moving of the reading sensor;
   wherein said control circuit performs a control such that the moving speed of the reading sensor when reading a portion of the document that is further from the reading sensor is higher than the moving speed of the reading sensor when reading a portion of the document that is closer to the reading sensor.

7. The image reading apparatus comprising:
   a table having a setting plane on which a document is set;
   a leg which projects from the table;
   a head section positioned on the leg;
   a line sensor incorporated in the head and aligned in a first direction, the line sensor being moveable in a second direction while the line sensor reads an image of the document; and
   a controller which changes a speed of movement of the line sensor during the reading of the image of the document while moving of the line sensor;
   wherein the control circuit increases the speed of movement of the line sensor to be higher when the line sensor reads a portion of the document in which the line density is coarse than the speed of movement of the line sensor when the sensor reads a portion of the document in which the line density is fine.

8. The image reading apparatus comprising:
   a table having a setting plane on which a document is set;
   a leg which projects from the table;
   a head section positioned on the leg;
   a line sensor incorporated in the head and aligned in a first direction, the line sensor being moveable in a second direction while the line sensor reads an image of the document; and
   a controller which changes a speed of movement of the line sensor during the reading of the image of the document while moving of the line sensor;

wherein the setting plane of the table comprises a bottom side from which the leg projects and a top side which is opposite to the bottom side, and the control circuit increases the speed of movement of the line sensor to be higher when the line sensor reads the document at the bottom side than the speed of movement of the line sensor when the line sensor reads the document at the top side.

9. The image reading apparatus comprising:

a table having a setting plane on which a document is set;

a leg which projects from the table;

a head section positioned on the leg;

a line sensor incorporated in the head and aligned in a first direction, the line sensor being moveable in a second direction while the line sensor reads an image of the document; and a controller which changes a speed of movement of the line sensor during the reading of the image of the document while moving of the line sensor;

wherein said control circuit changes the moving speed of the line sensor in multiple steps such that a number of the multiple steps is at least equal to a reading density of the document image.

10. The image reading apparatus comprising:

a table having a setting lane on which a document is set;

a leg which projects from the table;

a head section positioned on the leg;

a line sensor incorporated in the head and aligned in a first direction, the line sensor being moveable in a second direction while the line sensor reads an image of the document; and a controller which chances a speed of movement of the line sensor during the reading of the image of the document while moving of the line sensor;

wherein said control circuit performs a control such that the moving speed of the line sensor is higher when reading a portion of the document that is further from the line sensor than the moving speed of the line sensor when reading a portion of the document that is closer to the line sensor.

* * * * *